United States Patent Office 3,518,206
Patented June 30, 1970

3,518,206
SUPPORTED CATALYSTS COMPOSED OF SUBSTRATE COATED WITH COLLOIDAL SILICA AND CATALYST
Donald Maurice Sowards, Ashbourne Hills, Claymont, and Alvin B. Stiles, Welshire, Wilmington, Del., assignors to E. I. du Pont de Nemours and Company, Wilmington, Del., a corporation of Delaware
No Drawing. Continuation-in-part of application Ser. No. 684,553, Nov. 20, 1967, which is a continuation-in-part of application Ser. No. 513,563, Dec. 13, 1965. This application May 17, 1968, Ser. No. 729,901
Int. Cl. B01j *11/06, 11/40*
U.S. Cl. 252—446  6 Claims

ABSTRACT OF THE DISCLOSURE

Catalyst substrates or supports having a low surface area are coated with colloidal amorphous silica spherulites to obtain a high surface area coating. The complete supported catalyst is formed by subsequent application of the catalytic material to the dried coating or optionally the liquid silica coating composition can contain the catalytic materials and the complete catalyst coating formed in one step.

CROSS REFERENCE TO RELATED APPLICATIONS

This application is a continuation-in-part of our copending application Ser. No. 684,553, filed Nov. 20, 1967, now abandoned, which application is a continuation-in-part of our copending application Ser. No. 513,563, filed Dec. 13, 1965, now abandoned.

BACKGROUND OF THE INVENTION

To be useful in many catalytic reactions, many catalyst supports require that a high surface area coating be deposited upon its surface. The coating provides porosity so that the catalytic materials present can be more effective. This deposit or coating should be easy to apply, durable and free from cracking.

It has been difficult to apply these high surface area coatings to catalyst supports without the use of materials which will adversely affect the catalytic activity. This is particularly true of rugged catalyst supports which are usually very dense, non-porous and have smooth surfaces.

BRIEF SUMMARY OF THE INVENTION

This invention relates to supported catalysts. It is more particularly directed to supported catalysts made up of low surface area substrates coated with colloidal amorphous silica spherulites and catalytic material and to methods for preparing such supported catalysts.

According to this invention it has been found that adherent, durable, highly active catalyst coatings of high specific surface can be provided on a substrate having a low surface area by coating the substrate with colloidal amorphous silica spherulites and catalytic material. The catalytic material can be applied to the substrate either subsequently to or simultaneously with the colloidal silica.

Colloidal silica spherulites can be applied to the substrate in the form of a silica sol by dipping the substrate into the sol or by spraying or brushing the sol onto the substrate. In the resulting catalyst, the film of silica spherulites or clusters of these spherulites entrap the surrounding catalyst particles.

DETAILED DESCRIPTION OF THE INVENTION

By the term "low surface area substrate" is meant materials which have very little surface porosity and as a result have been difficult to coat with catalytic materials and have fewer sites at which catalytic activity can take place. Such materials include glass, metals, and enamel, which are substantially devoid of surface porosity. It also includes materials which have minute surface porosity but which are not impregnated in the usual sense by treatment with silica sols, such as porcelain, fused alumina, fused silica, mullite, beryl, zirconia, dense sintered alumina, chromia, spinel, magnesia, fused magnesia, and titania.

The processes of the invention can also be used to apply high surface area catalytic coatings on porous catalyst supports; however, the real advantages of the process are realized when it is used on supports of low surface area.

The size or form of the support is immaterial and it can be orientated or unorientated; thus it can be in the form of a honeycomb, pellets, granules, spheres, bars, rods, tubes, rolls, spirals, screens, beads, coils or any of the conventional shapes of the art.

Particularly preferred as support materials for use in this invention are thin-walled refractory ceramic structures which can be made by methods which have recently become known in the art. Such structures generally have a predetermined orderly shape, and are made up of ceramic sections ranging in thickness from say about 1 mil up to 250 mils or more. Examples of structures of this type are screens, tubes and tube bundles, plates, perforated sheets, and honeycombs. More complex and less common shapes are also contemplated since methods are now available for fabricating thin-walled ceramic structures in virtually any desired shape. These methods are described briefly below. No extended discussion is necessary since those skilled in the art are already familiar with the procedures.

U.S. Pat 3,112,184 to Hollenbach describes a method for making thin-walled ceramic structures such as honeycomb. According to this method a suspension containing a finely divided sinterable ceramic material and a binding agent is applied to each side of a flexible carrier. The coated carrier is then molded into the desired shape and fired to sinter the ceramic. For example, in making honeycomb the coated carrier is corrugated and corrugated sheets are placed node to node or corrugated sheets are alternated with noncorrugated sheets to form a structure resembling a honeycomb. According to the disclosure, the carrier is preferably an organic fibrous material which will decompose under the conditions of sintering, but inorganic carriers which remain in the structure can also be used. Also according to the disclosure, this method can be used to produce ceramic structures of virtually any composition; examples include glasses such as borosilicates, soda-lime-silicates, lead-silicates, alumino silicates, refractories such as sillimanite, magnesium silicate, magnesia, zircon, zirconia, petalite, spodumene, cordierite, corundum and the glass ceramics.

British Pat. 931,096, published July 10, 1963 discloses a similar method for making thin-walled ceramic articles. In this method, flexible sheets containing sinterable ceramic particles are formed then used to fabricate a structure of the desired shape. The assembly is then fired to sinter the ceramic particles and weld the sheets at points of contact. The sheets are made by mixing the ceramic particles with plasticizing ingredients such as organic polymers and forming the mix into thin films. The film is preferably formed on a carrier such as a thin metal foil which provides support during corrugation. After corrugation, the green film is removed from the support and is used in making a ceramic structure. The structure is then fired to sinter the ceramic particles. This method, according to the disclosure, is also applicable to a wide range of sinterable ceramic materials.

U.S. Pat. 3,255,027 to Talsma discloses a particularly suitable method for making the thin-walled ceramic structures used as supports for the catalysts of this invention. In this method, aluminum foil is fabricated into a structure having the configuration of the desired final product and is fired under controlled conditions to oxidize the aluminum to alpha-alumina. Prior to the firing step aluminum is coated with a fluxing agent which serves to prevent inhibition of oxidation due to oxide scum formation on the surface of the alumium. Examples of fluxing agents disclosed in the patent as being suitable include alkali metal and alkaline earth metal oxides and precursors of these oxides, i.e. compounds which yield the oxides on firing. A particularly suitable agent is sodium oxide which is applied as sodium silicate.

The ceramic products resulting from this process are substantially pure alpha-alumina. If desired, the chemical composition of the structures can be modified by including in the coating composition finely divided particles of filler refractory oxide. The filler refractories may, if desired, be one or more of those which will react with the alumina as it is formed. If a reactive filler, such as magnesia and/or siilca is used, the honeycomb structure will contain the corresponding reaction product such as spinel, cordierite, or mullite. The products of this process are characterized by outstanding strength and thermal shock resistance.

As disclosed in the Talsma patent, honeycomb structures may be fabricated by corrugating sheets of aluminum coated with fluxing agent and placing the coated sheets together node to node. Where sodium silicate solution is used as the fluxing agent, the body will have sufficient green strength to maintain its shape until it is fired. Alternatively, the honeycomb structure may first be fabricated from the aluminum foil using methods well known in the art and described in the patent literature. Reference is made to U.S. Pats. 2,610,934, 2,674,295, and 2,734,843 for teachings concerning the art of making honeycomb. Suitable prefabricated aluminum honeycomb structures for use in the process of the Talsma patent are available commercially and may be purchased from Hexcel Corporation or Bloomingdale Rubber Division of American Cyanamid, both of Havre de Grace, Md. Structures with nominal cell sizes ranging from ⅛″ up to ¾″ and foil thicknesses of 0.7 mil to 7 mils are readily available. Other sizes with cells ranging from say ¹⁄₃₂″ up to 2″ or higher and with foil up to ¼″ in thickness can be made and used in the process disclosed in the Talsma patent. The preferred structures are prepared using foil of about 2 mils thick.

An improvement in the process for making ceramic structures by the method of the Talsma patent is disclosed in co-pending U.S. application Ser. No. 367,856, filed May 15, 1964, now abandoned. In the process of this application the composition used to coat the aluminum template structure contains, in addition to the fluxing agent and filler refractory if any, small amounts of a vanadium compound. The products of the Talsma patent are characterized by having a double-walled structure. The double wall results from the fact that the aluminum foil, as it melts, flows outwardly through the oxide film formed on the outer surfaces of the foil and is oxidized at the outer surface of the oxide layer, thus leaving a large void in the final product corresponding approximately in thickness to the thickness of the original aluminum section. The inclusion of the vanadium compound in the coating composition causes the formation of bridges of refractory material between these double walls resulting in a product having even greater strength and thermal shock resistance than the products of the Talsma patent.

A further improvement in the process of the Talsma patent is disclosed in co-pending U.S. application Ser. No. 471,738, filed July 13, 1965. In the process of this application the composition used to coat the aluminum template structure contains aluminum powder in addition to the fluxing agent and filler refractory, if any. The aluminum powder, of course, is oxidized to alumina during firing along with the aluminum in the original metal template. This method provides structures which are similar to those of the Talsma patent in that they are double-walled, but the walls can be made much thicker than the central void. Thus the products are stronger than those of the Talsma patent.

A particularly preferred method for making catalyst support structures is disclosed in co-pending application Ser. No. 449,629, filed Apr. 20, 1965, now abandoned. The method is similar to that disclosed in Ser. No. 471,738, but silicon carbide is added to the composition used to coat the aluminum metal template. Upon firing, the silicon carbide reacts with the aluminum to provide mullite. Mullite structures are particularly preferred as catalyst carriers because of their high strength and low thermal expansion.

A further suitable method for making thin-walled ceramic structures is disclosed in co-pending application Ser. No. 336,983, filed Jan. 10, 1964, now U.S. Pat. 3,338,995. In this method a "fugitive" material, e.g. paper, is coated with a composition including aluminum powder, a binder, a fluxing agent (of the type disclosed in the Talsma patent), and a liquid carrier. The "fugitive material" may be first coated then used to fabricate a honeycomb or similar structure or the honeycomb may be first fabricated from the fugitive material then coated. In either case, the coated structure is fired in an oxygen-containing atmosphere to burn out the fugitive material and oxidize the aluminum. Filler refractories can of course be included in the coating compositions to provide ceramics including compounds and/or solid solutions of alumina with other oxides.

Silica sols suitable for use in preparing the supported catalysts of this invention can be made by conventional procedures such as flame hydrolysis or oxidation of silicon tetrachloride, deionization of alkali metal silicate solutions followed, if desired, by particle size build-up processes, and oxidation of silicon metal in aqueous ammonia or amine solutions. Spherulite size in the sols may range from as low as 2 or 3 millimicrons up to as large as is available, say about 250 millimicrons. Preferred sols are those having spherulites with average diameter in the range of about 5–150 m$\mu$. The sols used should preferably have a low alkali metal content since high alkali content can promote sintering of the silica and consequent loss in surface area. In general, it is desirable that the alkali metal content of the sol be less than 5000 parts per million parts of $SiO_2$. For most applications it is preferred that the alkali metal content be less than 200 p.p.m. (on the dry silica basis) and in some applications levels of 50 p.p.m. or less are highly desirable. The methods mentioned above are suitable for preparing sols having sufficiently low alkali content for purposes of this invention. For details of procedure on making silica sols, reference can be had to the following U.S. patents: Byrd 2,244,325; Bechtold and Snyder 2,574,902; Alexander 2,750,345; Iler 2,956,958; Dirnberger and Nelson 2,974,109; Balthis 2,614,995 and 2,614,994; Montenyohl and Olson 2,614,993.

The aquasols of colloidal, positively charged silica particles of U.S. Pat. 3,007,878 to Alexander et al., can also be used in the process of the invention. Thus the term "colloidal amorphous silica spherulites" includes these positively charged silica particles.

The support can be coated with the silica sol by any convenient method, e.g., my immersion into the sol, spraying, painting and the like. The support is then drained to remove the excess and dried. The coating and drying steps can be repeated until the desired thickness of coating is obtained. Under many conditions, one coating will be sufficient; however, depending upon the end use, two or three coatings may be desired.

Catalytic materials which can be employed according to the invention include all of the solid inorganic materials commonly used as such. Thus there can be used the oxides, cerates, chromates, chromites, manganates, manganites, molybdates, tungstates, carbonates, stannates, ferrites and vanadates of such metals as iron, cobalt, nickel, zinc, palladium, platinum, ruthenium, rhodium, manganese, chromium, copper, cadmium, silver, calcium, barium, mercury, tin, lead, molybdenum, tungsten, the rare earths and mixtures of these compounds. The precious metals such as ruthenium, rhodium, palladium, and platinum can of course also be used in elemental form. The catalytic material can also be a molecular sieve, e.g., natural or synthetic zeolites.

The catalytic material can also be activated carbon alone or in combination with other catalytic materials. The thus produced activated carbon catalyst has applications in air purification or as an absorbent in ductless hoods or the like.

The useful activated carbons are any form of carbon which has a high adsorptive capacity for gases, vapors and colloidal solids such as dust and aerosols. The carbon content of activated carbon ranges from about 10% for bone charcoal to 98% for some wood charcoal, and its density ranges from 0.08 to nearly 0.5.

Activated carbon is usually produced by the destructive distillation of wood, peat, lignite, bones or other carbonaceous matter. In many instances, "activation" is necessary to develop the adsorptive power. The "activation" is usually accomplished by heating to high temperatures (800–900° C.) with steam or carbon dioxide to bring about a porous structure.

In some cases, hygroscopic materials, e.g. zinc chloride, phosphoric acid or sodium sulfate are added to the carbonaceous material prior to the destructive distillation or activation to increase the adsorptive capacity.

Activated carbons are commercially available and these materials are suitable for use in the process of the invention.

In some catalytic uses the harder, lower surface carbons, represented by channel or thermal blacks, as described in U.S. Pat. 2,823,235, are desired and may be used prior to or after coating with other catalytic materials. Compounds of the catalytic metals which decompose upon heating to provide the oxides can of course also be used. These include the hydroxides, carbonates, nitrates, and inorganic salts of the various metals, as well as ammonium salts such as ammonium metavanadate and ammonium molybdate. Particularly preferred catalyst for many oxidation reactions on account of their outstanding activity and stability at high temperatures as well as their low light-off temperatures are the mangano-chromia-manganites described and claimed in Howk and Stiles U.S. Pat. 3,216,954. Heteropoly acids such as are disclosed, for example, in U.S. Pats. 2,866,515 to Turkevitch and 2,491,695 to Stiles can also be used.

The molecular sieves useful in the catalysts of the invention can be treated in conventional ways to provide specificity. For example, cations within the crystalline lattice can be exchanged for other cations of various sizes and electrostatic charges. Thus any sodium ions present can be exchanged for metal ions from solutions of the salts of the metal. Also rare earth oxides can be introduced into the molecular sieve.

As indicated above, the catalytic material can be applied subsequent to or simultaneously with the colloidal silica spherulites. Application of catalytic material to a previously silica-coated substrate is accomplished by conventional methods for making supported catalysts. The amount of catalytic material applied is not critical and is dependent upon the ultimate use of the catalyst.

The methods to be used are so well-known that no extended discussion will be necessary to an understanding of the invention. In general, the method used will entail immersing the silica-coated support structure in a water solution of a soluble compound of the catalytic metal and adding a precipitant, thereby causing an insoluble compound of the metal to precipitate onto the support. The precipitants which can be used include the soluble carbonates, hydroxides, oxalates, chromates and the like. For example, a silica-coated honeycomb can be immersed in a solution of nickel nitrate in water and a precipitant such as ammonium carbonate can be added to precipitate nickel carbonate onto the support. The catalyst can then be dried and calcined to decompose the carbonate, leaving the catalytically active nickel oxide particles trapped within the silica coating.

Similarly the support structure can be immersed, for example, in a water solution of chromium anhydride and manganese nitrate and ammonia can be added to precipitate a mangano-chromia-manganite catalyst as disclosed in the Howk & Stiles Patent referred to above. Again, the support can be impregnated by immersion in a solution of a precious metal salt. The impregnated support can then be treated with a reducing agent such as formaldehyde, ethanol, or hydrogen to reduce the precious metal to the elemental form. As another example, a silica-coated ceramic honeycomb can be impregnated by immersion in a water solution of ammonium metavanadate and the impregnated support can be dried and calcined to convert the vanadate to catalytically active vanadium pentoxide. Where it is not convenient to immerse the silica-coated support in a solution or slurry of catalytic material, the catalyst can, of course, be sprayed or brushed onto the surface. Applications of these conventional methods to preparation of supported catalysts in the scope of this invention are further illustrated in the examples below.

Simultaneous application of the colloidal silica spherulites and catalytic material to the support structure can be accomplished simply by mixing a silica sol with a solution of a soluble compound of a catalytic metal and applying the mixture, by dipping, brushing or spraying, to the support, followed by drying and calcining to drive off any remaining moisture and to convert decomposable compounds to the catalytically active oxides. For example, a colloidal silica sol can be mixed with a solution of ammonium metavanadate and the mixture can be applied to a ceramic honeycomb. Subsequent drying and calcination converts the metavanadate to catalytically active vanadium pentoxide.

Alternatively, the silica sol can be mixed with a slurry of an insoluble catalytic material in very finely divided form, and this mixture can be applied to the ceramic support structure. In this method, the solid catalyst particles should be substantially all of a size which will pass a 20 mesh screen. For maximum catalytic activity per unit weight of catalyst, it is preferred that the catalyst particles be substantially all of a size which will pass a 325 mesh screen. Another reason for preferring smaller particles is that they are easier to make adhere to the support. This avoids formation of surface protrusions of a size which are more easily broken off. Expressed otherwise, the particles should be less than about 800 microns and preferably less than about 45 microns. There is actually no lower limit on the particle size of the solid insoluble catalytic material which can be used. Ordinarily, however, particles of at least 0.5 micron will be used.

Preparation of catalysts of this invention by simultaneous deposition of silica spherulites and catalytic material is further illustrated by the examples below.

When the catalytic material is activated carbon, it is sometimes advantageous to include sugar, e.g., sucrose, in the coating composition. Thus if the activated carbon particles are combined with colloidal silica and sugar in an aqueous medium, a slurry is obtained which can easily be applied to the catalyst support. This slurry upon being dried and calcined at about 300° C. provides a durable coating which is uniform and strongly adherent to the support.

It may sometimes be desirable to calcine the sugar containing coatings at higher temperatures (up to 900° C.) in special atmospheres such as steam, carbon dioxide, methane, hydrogen and the like.

For many applications it will be found desirable to include in the catalytic coating a granular, porous inorganic material containing macropores between about 2000 and 50,000 angstroms in size. One purpose of this material is to provide a rough surface so as to avoid insofar as possible piling of the catalytic material and consequent loss of efficiency. A further purpose in including such a material is to prevent excessive shrinkage of the film as the silica gel dries after application to the substrate; in the absence of such materials, the resulting silica film may be somewhat crazed and discontinuous. The granular material ordinarily will consist of particles between about 5 and 75 microns in diameter (i.e. −200 mesh) but larger particles, up to about 2 millimeters, and smaller particles, down to about 0.5 micron can also be used. The 5–45 micron range (i.e. −325 mesh) is preferred because larger particles are more difficult to make adhere to the base. The surface area of the inert porous material should be in excess of 2 m.$^2$/g., as determined by nitrogen adsorption.

Suitable granular porous materials include alumina, thoria, silica, magnesia, titania, zirconia, oxides of calcium, barium, strontium and the rare earths, diatomaceous earths such as kieselguhr, siliceous clays such as bentonite, synthetic and natural zeolites, other synthetic siliceous materials including micaceous materials, and bauxite. It should be observed that the inert porous material must be chosen with the conditions of use in mind. For example, there will be described below a catalyst of this invention which is particularly adapted for use in the oxidation of $SO_2$ to $SO_3$. In this application bauxite could be used in the coating composition but it is best to avoid it because the alumina reacts with the $SO_3$ to form flaky aluminum sulfate.

It should also be observed that at high temperatures some of the above porous granular materials may react with the colloidal silica. This can be advantageous under some circumstances. For example, supported catalysts for operation at high temperatures, say above about 600° C. can be provided by including in the coating one or more metal oxides such as alumina (gamma form), magnesia, titania, and/or zirconia, which will react with the silica to provide a composite which sinters at higher temperatures than silica alone. Sintering is to be avoided because it results in loss of surface area, and thus loss of catalytic activity. Hence, this may be a further incentive for including such porous materials. Of course for this particular purpose the magnesia, alumina, titania and/or zirconia can also be conveniently applied to the support in the form of mixtures of their sols with the silica sol.

The surface area of the coating material, i.e. the silica spherulites, catalytic material, and porous granular material, if any, should be at least about 5 m.$^2$/g. and preferably at least 10 m.$^2$/g. Surface area of the coating can be as high at 200 m.$^2$/g. by using a large proportion of colloidal silica. Surface area of the coating is determined by the B.E.T. technique, well known in the art. Samples can be obtained by applying the coating to glass or an organic film, drying, and removing the coating material, and calcining.

Other materials besides those already mentioned can be included in the coatings for specific applications. Catalyst promoters and/or fluxing agents can sometimes advantageously be included in the catalytic coatings. For example, a supported catalyst for oxidation of $SO_2$ to $SO_3$ made up of ammonium metal vanadate and a silica sol deposited on a ceramic honeycomb preferably will also have both a promoter and a fluxing agent in the coating. The purpose of the fluxing agent is to lower the melting point of the vanadia catalyst so that it is liquid at the temperature of the $SO_2$ reaction, which is ordinarily between 400–600° C.

Examples of catalyst promoters which can be used are the compounds of the transition metals and the rare earth metals, especially compounds, e.g. mineral salts and oxides, of iron, cobalt, nickel, manganese, ruthenium, rhodium, palladium, and platinum. Fluxing agents which can be used are in general salts of alkali metals, particularly sodium, potassium, and lithium. Of course the promoter compound and fluxing agent of choice will depend upon the ultimate application contemplated for the catalyst. For vanadia catalysts intended for use in oxidation of $SO_2$, it is of course preferred to use sulfates or salts (e.g. carbonates) of the promoter metals and alkali metals which decompose with subsequent formation of sulfates. Alkali metal halides, which are otherwise commonly used as fluxing agents, are not suitable in this application because of their corrosiveness in the system.

Proportions of ingredients in the supported catalysts of this invention can vary widely depending upon the application. In general the ratio of the weight of the catalytic coating, i.e., the silica coating composition containing catalytic material, to the weight of the support material will be in the range of about 0.01:1 to 10:1. Lower amounts of the coating ordinarily do not provide adequate catalyst and in fact a ratio of 0.01:1 will ordinarily not provide sufficient catalytic activity unless the proportion of catalyst in the coating is high. Especially where substantial proportions of ingredients other than catalyst are present in the coating it will ordinarily be desirable to use at least 0.1 part coating per part of support.

Higher ratios above 10:1 are ordinarily merely wasteful of catalyst. Moreover, the upper limit of the ratio of catalyst coating to support is ordinarily limited by the shape of the support and the characteristics required of the final product. For example, in the case of a catalyst coated ceramic honeycomb it is ordinarily desired that the catalyst system present as much open area as possible in order to minimize pressure drop through the catalyst. Certainly the amount of coating should not be so great as to close the honeycomb cells.

The preferred range of ratios of coating weight to support weight will ordinarily be between 0.05:1 and 2:1. The optimum ratio for any given catalyst-support combination and for any particular application can be readily determined by simple experimentation.

The above generalizations are of course meaningful only where the support is a relatively light-weight structure such as thin-walled glass or metal tubes or ceramic honeycombs. It is to be understood that the method of this invention is equally applicable to putting a catalytic coating on surfaces of massive heavy structures such as the exterior of tubes in a tube bundle of a heat exchanger, and in this event the weight of the catalyst coating will be extremely minute in comparison to the weight of the support material. It is thus perhaps more meaningful to say that the amount of coating composition deposited on the impervious substrate should be sufficient to provide a continuous film between about 0.1 mil and 1/16 inch in thickness, and preferably, between about 1 and 25 mils in thickness.

In order to provide a catalytic coating of adequate adhesiveness and sufficient surface area, the amount of silica should be between 5 and 85%, and preferably between 10 and 60%, of the total weight of the coating. As a general rule, better adhesion and more surface area are provided by silica sols having smaller particles. Thus, the amount of silica required decreases with decreasing particle size in the sol used.

In the coating composition containing catalytic material, the amount of catalyst can vary from as little as 1% to as much as 90% by weight of the coating, with a preferred range being 20 to 60%. The inert, porous, granular material such as kieselguhr can make up to 0 to 94% of the weight of the coating, it being preferred to have at least 30% but less than 60% of this material if the addition is made. If a fluxing agent is used, as in the vanadia-coated honeycomb used for $SO_2$ oxidation, it can make up as much as 50% of the coating. The addition of a fluxing agent will not ordinarily be worthwhile unless at least 1% is used, and little benefit is gained by having more than 40% present. Similarly, a promotor, if any is used, can constitute 90% of the coating, but ordinarily amounts between 0.5 and 10% will be used.

It is to be understood that the invention of this application is in the nature of the components of the supported catalysts, rather than in their relative proportions. The above figures and the examples below are given for the guidance of those wishing to practice the invention. The proportions can vary widely. With this information those skilled in the art will have no difficulty in determining the optimum proportions of ingredients for a given application.

The invention will be illustrated by the following examples:

EXAMPLE 1

Item 1

The following ingredients are weighed out, mixed and stirred for a few minutes with a laboratory propeller-type mixer until a homogeneous composition is obtained:

(a) 1% solution of carboxymethyl-cellulose, 1 pound;
(b) 41° Bé sodium silicate solution ($Na_2O:SiO_2$—1:3.25, Ca. 38% solids), 1 pound;
(c) —200 mesh aluminum powder, ½ pound;
(d) —200 mesh hydrated aluminum oxide powder, 1 pound;
(e) green silicon carbide, approximately 325 mesh, 1½ pounds;
(f) —50 mesh bonding clay, ½ pound. The clay used has the following approximate analysis: ignition loss, 9.4%; $Al_2O_3$, 57.3%; $SiO_2$, 28.5%; alkali metal oxides, 1–5%; MgO, 0.22%; CaO, 0.08%; other impurities, 3.5%.
(g) water, 250 cc.

Item 2

An aluminum honeycomb is etched by immersing in a 1% solution of sodium hydroxide for 3 minutes. The honeycomb used is in the shape of a square parallelepiped having the dimensions 4″ x 6″ x ½″ with the honeycomb cell axes perpendicular to the 4″ x 6″ faces. Nominal diameter of the honeycomb cells is ⅛″. The honeycomb is made from aluminum alloy 5052 (2.5% magnesium) having a thickness of 0.002 inch.

Item 3

The aluminum honeycomb is dipped into the composition prepared under Item 1, drained and air-dried. The coated honeycomb is then pressed at 5 p.s.i. between platens heated to 150° C. for 3 minutes. From the heat set honeycomb, cylinders, 15/16″ diameter by ½″ long with the longitudinal axes of the honeycomb cells parallel to the axis of the cylinder, are cut by die cutting. These cylinders are then coated a second time by immersing in the slurry of Item 1, drained and air-dried.

Item 4

The coated honeycomb-cylinders are placed into a gas-fired furnace and fired to 1580° C. over a 5 day period according to the following schedule:

50° C. to 800° C. in 8 hours
800° C. to 1000° C. in 24 hours
1000° C. to 1250° C. in 24 hours
1250° C. to 1380° C. in 24 hours
1380° C. to 1430° C. in 24 hours
1430° C. to 1580° C. in 18 hours The furnace is then cooled to room temperature over a period of 48 hours and the structure is removed. The fired ceramic structure corresponds closely in shape and size to the original aluminum honeycomb. X-ray analysis of a sample of the product shows that the structure is predominantly mullite with a substantial amount of crystalline alumina and a small amount of amorphous material.

Item 5

A catalytic composition is prepared by mixing the following ingredients:

(a) 100 grams of kieselguhr (—200 mesh);
(b) 300 grams of colloidal silica (15% silica, average particle size 7 millimicrons);
(c) 15 grams of ammonium metavanadate;
(d) 2 grams of nickel sulfate hexahydrate;
(e) 10 grams of potassium sulfate.

Item 6

The honeycomb is then dipped into the catalyst composition, extracted, dried and calcined at 300° C. The coating, drying and calcining steps are repeated three times.

Item 7

A catalytic composition is prepared by mixing together the following ingredients:

(a) 50 grams of ammonium metavanadate;
(b) 50 grams of colloidal silica (15% silica average particle size 7 millimicrons);
(c) 150 milliliters of distilled water;
(d) 25 grams of 20–40 mesh $SO_2$ oxidation catalyst.

The 20–40 mesh $SO_2$ oxidation catalyst is obtained by crushing commercial pellets and screening out the desired fraction. The chemical composition of the pellets is:

| | Percent by weight |
|---|---|
| Volatiles—750° F. | 1 |
| $V_2O_5$ | 9 |
| $K_2SO_4$ | 29 |
| $SO_3$ | 12 |
| $SiO_2$ | 50 |
| $FeSO_4$ | 1 |

Item 8

The previously coated honeycomb is then dipped into the mixture prepared in Item 7, extracted, dried and calcined at 300° C. The coating, drying and calcining steps are repeated once.

When tested in a laboratory reactor for oxidation of $SO_2$ to $SO_3$, the vanadia-coated honeycomb prepared as above provides high conversion at low light-off and conversion temperatures.

EXAMPLE 2

The procedure to be followed in this example is the same as that outlined for Example 1 through Item 4. The procedure to be followed in Item 5 instead of that given for Example 1 is as follows:

Item 5

100 grams of aluminum oxide derived by calcining beta-alumina trihydrate at 400° C. for 3 hours is milled for 18 hours with 240 grams of an aqueous dispersion of colloidal silica containing 15% $SiO_2$ and having a spherulite dimension of 7 millimicrons. The aluminum oxide derived from the alumina hydrate has a surface area of approximately 160 m.²/g. determined by the B.E.T. technique. The honeycomb cylinders are dipped in this slurry after the milling operation and the coated honeycomb is dried at 150° C. for 12 hours. The impregnation and drying procedure is thereafter repeated so that a total of 5 coatings have been applied and a total weight equivalent to 21% of the original weight of honeycomb has been added to the surface as a uniform, adherent film of silica-alumina particles.

Item 6

An aqueous soltuion of chloroplatinic acid is prepared equivalent to 1% platinum. The honeycomb coated according to the procedure described in Item 5 is immersed in the chloroplatinic acid solution until it is completely wet. It is thereafter drained and then is placed in a closed, heated vessel, except for gas inlet at one end and outlet at the other which permit hydrogen to be passed over the coated and platinum-impregnated honeycomb. Humidified hydrogen is passed through the vessel and over the coated and impregnated honeycomb at temperatures ranging from 70° C. to a final temperature of 250° C. The hydrogen is humidified by bubbling it through water at 70° C. The platinum is thereby reduced and activated. A catalyst so prepared is effective in oxidation reactions such as the oxidation of carbon monoxide to carbon dioxide, hydrogen to water, and for hte reduction of nitrogen oxides with appropriate reducing gases to produce hydrocyanic acid or to produce complete combustion and to produce harmless and deorodized gases. Furthermore, it can be used for hydrogenations such as the hydrogenation of acetylene to ethylene in the presence of excess ethylene. Additionally, it can be used for hydrogenations of benzene to cyclohexane or nitriles such as adiponitrile to hexamethylenediamine or aldehydes such as butyraldehyde to butyl alcohol.

Instead of the platinum specified above, there can be used an equal weight of palladium or a 50:50 mixture of platinum and palladium or rhodium and palladium or rhodium and platinum or ruthenium or ruthenium and rhodium. These catalysts also have activity for those reactions enumerated.

EXAMPLE 3

The procedure to be followed for Example 3 is the same as for Example 1 up to Item 5 which, however, is changed to the following:

Item 5

There is charged to a ball mill 75 grams of a catalyst prepared by the procedure described in Example 29 of U.S. Pat. 3,216,954, except that instead of using copper nitrate as stipulatde in Example 29, a stoichiometric equivalent of cobalt nitrate is used.

There is also charged 75 grams of aluminum oxide derived by calcining alpha-alumina monohydrate at 400° C. for 3 hours. (The aluminum oxide in this case is gamma-aluminum oxide having a surface area of 325 m.$^2$/g. and a crystallite size of 90 angstroms.) In addition, 240 grams of colloidal silica having a spherulite size of 15 millimicrons and as a 30% dispersion is added and finally 240 grams of distilled water. These are milled together for 18 hours.

Item 6

The honeycomb structures obtained in Item 4 of Example 1 are immersed in the milled slurry produced in Item 5. Thereafter they are dried and calcined at 300° C. for 2 hours.

The catalyst thus produced is effective for oxidation reactions, particularly those involved in fume abatements where combustion at low temperatures and with low pressure drop of odorous combustible fumes is required. This catalyst also is effective for partial oxidation such as the conversion of alcohols to aldehydes in a limited oxygen environment or for propylene to acrolein and acrylic acid or for butane to maleic anhydride.

EXAMPLE 4

Example 4 is the same as Example 1 up to Item 5 which, however, becomes as follows:

Item 5

75 grams of silver oxide prepared by calcining silver carbonate derived by precipitation from silver nitrate solution with sodium carbonate, 75 grams of gamma-alumina derived as described in Example 3, and 240 grams of colloidal silica purchased as "Cab-o-sil" from the Godfrey L. Cabot Company and which is manufactured by oxidation of silicon tetrachloride are milled together with 750 ml. distilled water for 18 hours to produce a finely divided suspension or paste.

Item 6

The honeycomb structures are immersed in the slurry produced in Item 5 above and are dried thereafter at 150° C. The immersion and drying are repeated for 3 times giving a total coating weight of 9% on the basis of the weight of the original honeycomb. Thereafter the structures are given a single calcining at 500° C. for 1 hour to decompose the silver oxide to elemental silver. The catalyst thus produced is effective for such oxidations as methyl alcohol to formaldehyde, ethylene to ethylene oxide and cyclohexanol to cyclohexanone.

Instead of silver there can be used copper oxides or a mixture of copper and silver oxides or silver oxide plus finely divided gold.

EXAMPLE 5

The procedure is the same in this example as for Exampe 1 up to Item 5.

Item 5

There is prepared a catalyst of a bismuth phosomolybdate type as described in Example C of U.S. 2,491,695 with the exception that an equal weight of 85% phosphoric acid is used to replace the sulfuric acid called for in the example. 75 grams of the catalyst thus prepared is milled together with 75 grams of gamma-alumina derived by the procedure of Item 5, Example 3. There is placed also in the same mill 130 grams of an aqueous dispersion of colloidal silica containing 30% $SiO_2$, the $SiO_2$ having a particle size of 250 millimicrons. There is added also 240 grams of distilled water. These are milled together for 6 hours and the product is then removed from the mill.

Item 6

The honeycomb material immersed in the thus prepared slurry is thereafter dried and the immersion and drying are repeated for a total of 5 times until a weight of solids from the slurry is deposited equal to 27% of the original weight of the honeycomb structure. The thus prepared catalyst is finally calcined at 650° C. in an air atmosphere for 6 hours.

The catalyst thus produced is effective for the oxidation of methanol to formaldehyde, propylene to acrolein and acrylic acid, for the reaction of ammonia, propylene and air to produce acrylonitrile and for the reaction of 1,4-hexadiene plus air plus ammonia to produce adiponitrile. It is also effective for the oxidation of ethylene to ethylene oxide and under the proper conditions propylene to propylene oxide.

EXAMPLE 6

Example 6 is the same as for Example 1 for the first 4 items. Item 5, however, is changed to the following:

Item 5

An antimony-molybdenum-phosphorus oxides catalyst is prepared by milling together antimony oxide, ammonium molybdate and phosphoric acid in a ratio of 1 molybdenum, 1 antimony and 0.5 phosphorus on an atomic ratio. Specifically, the procedure consists in milling together 291 grams of antimony oxide, $Sb_2O_3$, 196 grams of ammonium molybdate, $(NH_4)_2MoO_4$, and 49 grams of ortho-phosphoric acid together with 500 grams of distilled water to produce a finely divided paste. The phosphoric acid is introduced as an 85% solution of ortho-phosphoric acid. After milling the slurry is placed in an autoclave and is heated to 350° C. and 3000 p.s.i. for 8 hours to produce a hydrothermal reaction. Thereafter the catalyst is removed from the autoclave and is dried. 75 grams of the catalyst as thus produced plus 100 grams of gamma-aluminum oxide having a surface area of 100 m.²/g. together with 240 grams of a 15% solids suspension of colloidal silica having a spherulite dimension of 4 millimicrons and derived according to a procedure of U.S. 2,614,995 involving the reaction of silicon metal and ammonium hydroxide, together with 240 grams of distilled water, are milled together to produce a paste.

Item 6

After the paste has been removed from the ball mill, the honeycomb structures are immersed in it and are thereafter dried. A firmly adherent and strong catalyst is thus produced which has activity for the oxidation reactions as described for the preceding Example 5.

In the preparation of the catalyst stipulated in this example, there can be substituted for the antimony an equal stoichiometric quantity of arsenic. Also, instead of the molybdenum there can be substituted a stoichiometric quantity of tungsten. Furthermore, there can be substituted for 50% of the molybdenum, a stoichiometric equivalent of tungsten or there can be substituted for 50% of the molybdenum, 40% tungsten and 10% vanadium on a stoichiometric atomic basis.

EXAMPLE 7

In Example 7 the procedure is the same as for Example 1 through the first 4 items.

Item 5

Prepare a slurry by milling 100 grams of thorium oxide derived by calcining thorium nitrate at 500 C. to decompose the nitrate to thorium oxide. 240 grams of an aqueous dispersion of colloidal silica containing 50% solids as 150 millimicron spherulites and 240 grams of distilled water are also milled with the thorium oxide to produce a thin paste for applying to the honeycomb structure. There is separately prepared an aqueous solution comprising 12 grams of silver nitrate and 0.20 gram of barium nitrate in 100 milliliters of distilled water.

Item 6

The honeycomb structure is immersed in the silica-thoria slurry and is thereafter calcined at 300° C. This operation is repeated 3 times until a total of 12% coating has been placed on the honeycomb on the basis of the original weight of the honeycomb. Thereafter the coated honeycomb is immersed in the silver nitrate-barium nitrate solution and is dried and calcined at 500° C. This operation is repeated for 3 times until a total of 4% silver and barium oxide has been placed on the support on the basis of the original weight of the honeycomb.

The catalyst thus prepared is effective for the oxidation of ethylene to ethylene oxide, propylene to propylene oxide, methanol to formaldehyde and cyclohexanol to cyclohexanone.

Instead of the 4% silver composition the number of coatings or the concentrations of the solution can be increased so that the total weight of silver can be as high as 13%, thus giving an almost uniform silver-like coating on the honeycomb structure.

EXAMPLE 8

Example 8 is performed the same as for Example 1 through Item 4. Thereafter the procedure is as follows:

Item 5

A slurry is prepared by milling together 75 grams of gamma-alumina having a surface area of 175 m.²/g., 50 grams of magnesium oxide having a surface area of 125 m.²/g. and 240 grams of a suspension of colloidal spherical silica having a spherulite diameter of 7 millimicrons and a SiO₂ content of 15%, together with 240 grams of distilled water. There is also prepared simultaneously a solution comprising 196 grams of ammonium molybdate and 291 grams of cobalt nitrate in 2000 milliliters of distilled water.

Item 6

The honeycomb structures are immersed in the slurry and thereafter are dried at 200° C. The immersion and drying are repeated until a total of 4 coats has been applied equivalent to a weight of 18% of that of the original honeycomb. Thereafter the coated honeycomb is immersed in the cobalt nitrate-ammonium-molybdate solution and is thereafter calcined at 500° C. for 2 hours. This coating and calcining is repeated for a total of 3 times so that there are 3 coatings and calcinings with the cobalt-molybdate solution and a total of 9% cobalt molybdate solution and a total of 9% cobalt molybdate is applied to the surface.

This catalyst is effective for the oxidation of methanol to formaldehyde, propylene to acrylic acid and acrolein, isobutylene to methacrylic acid and for the conversion of a mixture of ammonia, air and propylene to acrylonitrile.

Instead of the cobalt moylbdate specified above, there can be substituted for one-half of the cobalt nitrate a half mole of calcium nitrate which would be 82 grams. In this case the calcium molybdate formed is insoluble so that when the honeycomb is immersed the solution slurry must be well agitated to prevent the settling out of the calcium molybdate and thus forming a coating on the honeycomb which is deficient in the calcium molybdate. The purpose of adding the calcium molybdate is to increase the thermal stability of the cobalt molybdate. Various ratios of substitution of the calcium for the cobalt can be made to attain the desired thermal stability. Such a catalyst is effective for the previously mentioned oxidations but also is effective for desulfurization reactions such as the hydrodesulfurization of sulfur bearing crude oils or their individual constituents.

EXAMPLE 9

This example is the same as for Example 1 for the first 4 items.

Item 5

150 grams of finely divided barium sulfate together with 240 grams of distilled water and 240 grams of an aqueous dispersion of colloidal silica containing 15% SiO₂ having a spherulite diameter of 5 millimicrons are milled together for 24 hours to produce a thin uniform aqueous suspension. There is separately produced a solution of 291 grams of cobalt nitrate hexahydrate in sufficient distilled water to produce 1 liter of solution.

Item 6

The honeycomb structures are immersed in the barium sulfate-colloidal silica slurry and are thereafter calcined at 400° C. The immersion and calcining are repeated for 4 times until a total of 15% solids are placed on the honeycomb on the basis of the original weight of the honeycomb. Thereafter the coated honeycomb is immersed in the cobalt nitrate solution and the structure is again calcined but this time at 300° C. for 2 hours. The coating and calcining of the cobalt salt is repeated until a total of 9% cobalt oxide has been placed on the surface on the basis of the original weight of the honeycomb structure.

This catalyst after reduction at 500° in a stream of hydrogen is effective for hydrogenations such as adiponitrile to hexamethylenediamine, acetonitrile to monoethylamine and CO and hydrogen to various oxygenated products.

There can be substituted for the barium sulfate an equal weight of barium oxide, strontium sulfate, lead sulfate or calcium sulfate to produce similar results.

EXAMPLE 10

The procedure to be followed in this example is the same for the first 4 items of Example 1.

Item 5

75 grams of magnesium oxide, 25 grams of beryllium oxide and 25 grams of lanthanum oxide having surface areas, respectively, of 110, 160 and 95 m.$^2$/g. are milled together with 500 grams of water and 50 grams of collodidal silica having a spherulite size of 10 millimicrons and derived as described in Item 5, Example 4. The milling is continued for 18 hours and until all are reduced to an aqueous suspension. Simultaneously there is made up an aqueous solution comprising 290 grams of nickel nitrate hexahydrate in sufficient distilled water to produce a liter of solution.

Item 6

The honeycomb sturcture is immersed in the slurry to produce a thin coating of the silicon, magnesium, beryllium and lanthanum oxides. Thereafter the coated ceramic material is calcined at 400° C. for 1 hour. The coating and calcining is repeated so that a total of 3 coats is applied and a weight corresponding to 12% of the original weight of the honeycomb has been applied to its surfaces. Thereafter the coated honeycomb is immersed in the nickel nitrate solution and the coated honeycomb is calcined at 350° C. for 1 hour. This coating and calcining step is repeated 2 times providing a total weight of 8% nickel oxide based on the original weight of the honeycomb. Thereafter the coated honeycomb is subjected to a hydrogen atmosphere at 450° C. for 2 hours to convert the nickel oxide to elemental nickel.

This catalyst is effective in hydrogenation reactions such as the hydrogenation of acetonitrile to monoethylamine, adiponitrile to hexamethylenediamine and for saturating double bonds such as is accomplished when benzene is hydrogenated to cyclohexane, phenol is hydrogenated to cyclohexanol and isobutylene is hydrogenated to isobutane.

Instead of the nickel nitrate stipulated above, a like quantity of cobalt nitrate hexahydrate can be substituted to produce a catalyst effective for hydrogenations in which cobalt is specifically effective such as reduction of nitriles to amines.

EXAMPLE 11

The procedure followed in Example 11 is the same as that followed in Example 1 through the first 4 items.

Item 5

125 grams of silica gel having a surface area of 400 m.$^2$/g. is milled together with colloidal silica having a diameter of 40 angstroms and being free from foreign metallic anions because of the method of preparation which involved the reaction of silicon metal with ammonium hydroxide (Example 6, Item 5). The quantity of silica solids in the sol is 50 grams and the water content is 350 grams. The materials are milled together for 16 hours to produce a finely divided suspension in the water. Simultaneously, there is prepared a vanadium promoted iron molybdate catalyst via precipitation of the iron molybdate from an acidified solution of ammonium molybdate and ammonium vanadate by the incorporation of iron chloride into the solution. The ratio of the iron:molybdenum:vanadium in the finished catalyst is 1:5:0.1. The precipitate is washed free of chloride but is retained as a slurry comprising 15% solids in an aqueous suspension.

Item 6

The honeycomb structure is immersed in the silica dispersion first prepared and is thereafter calcined at 500° C. The coating and calcining are repeated a total of 4 times to produce 4 separate coats and a weight of solids on the surface of the honeycomb equal to 18% of the original weight of the honeycomb. Thereafter the coated honeycomb is immersed in the slurry of iron-molybdenum-vanadium catalyst and is thereafter calcined at 350° C. for 2 hours. This coating is repeated a total of 3 times so that a total catalytic quantity deposited on the surface amounts to 12% of the original weight of the honeycomb structure.

This catalyst is effective for the oxidation of methanol to formaldehyde, the synthesis of acrylonitrile from nitrogen oxide and propylene or from ammonia, oxygen and propylene and is also effective for specific oxidations in general.

Instead of the 125 grams of silica gel specified in Item 5, there can be used 125 grams of a 13% alumina, 87% silica having a surface area of 400 m.$^2$/g. and an acid site value of 0.21 as determined by the so-called butter-yellow technique which is well known in the petroleum industry.

Instead of the iron-vanadium-molybdate, there can be applied 0.2% platinum based on the original weight of the honeycomb which then is reduced by thermal treatment at 400° C. to produce a catalyst highly active for hydrocracking operations. This involves the simultaneous cracking, hydrogenating and isomerization of feeds represented for example by n-$C_{14}H_{30}$ which are thereby converted to useful isomerized materials having high octane rating in internal combustion gasoline engines.

EXAMPLE 12

The procedure of Example 5 is altered so that Items 1–4 are not performed and instead a 1½ inch coil of 14 turns of ¼ inch copper tubing is immersed in the slurry and the bismuth phosomolybdate compositions. By so doing a coating is produced on the exterior of the copper coil which amounts to approximately 2% of the original weight of the copper coil being the spheroidal silica coating material and approximately 1.5% being the bismuth phosomolybdate catalyst composition.

Item 6

The coil is housed in a reactor tube and a heat exchange liquid is circulated through the tube to maintain a temperature of 435° C. A gas comprising propylene, air and ammonia is passed through the reactor tube and over the coil to produce a high yield but low conversion of acrylonitrile. Thereafter the temperature is raised stepwise to 560° C. The conversion increases and the yield remains high, thus demonstrating that excellent temperature control of the catalyst can be maintained even in a highly exothermal reaction such as this.

Instead of the copper tube specified in Item 5, a stainless steel tube of similar dimensions and having a composition designated as AISI Code 304 is used with similar results.

EXAMPLE 13

The procedure of Example 2 is followed in this example with the exception that Items 1–4 are not performed. Instead of the honeycomb there is used a ceramic U tube having an internal diameter of ½ inch, a wall thickness of ⅛ inch and having a depth of the U of 18 inches and the internal distance between the walls of the U being 2 inches. This U tube is fabricated of fused silica and is totally impervious to gases and liquid. This tube is coated with the silica and alumina composition and subsequently with the platinum to produce a coating consisting of 5% silica-alumina and 0.05% platinum. This tube is inserted in a tubular housing so that gases can be passed over it and the products of the reaction collected. This catalytic unit is effective for ammonia oxidation to nitrogen oxide and for the synthesis of hydrocyanic acid from ammonia, air and methane. Gases are circulated through the interior of the U tube at controlled temperatures so as to control the wall temperature of the reaction and thus produce an isothermal condition otherwise not possible in an adiabatic converter.

EXAMPLE 14

The same procedure is followed in this example as that used for Example 7 with the exception that Items 1–4 are not performed. Instead of the honeycomb an AISI Code 310 stainless steel screen having a wire dimension of 1/100 inch and spacing of 8 openings per linear inch is used as support. The screen is formed into tight cylinders of multilayer walls (spirals) and having an internal opening 3/8 inch and an external diameter of 5/8 inch. The length is 1 inch. These are immersed first in the slurry of thorium oxide-silica spherulites and later in the silver-barium oxide catalytic materials specified in Example 7 so as to produce an adherent coating amounting to 3% of the weight of the original gauze as silica underlayer and 0.7% silver and 0.01% barium oxide also based on the original weight of the screen. This catalyst is also effective for oxidations such as ethylene to ethylene oxide, propylene to propylene oxide and acrylic acid and acrolein.

Instead of the stainless steel screen there can be used silver screen of similar dimensions or having smaller or larger wire and different mesh size. Copper screens or copper-silver alloy screens can also be used as the base for the coatings.

EXAMPLE 15

The same procedure is followed in Example 15 as that used in Example 9 except that Items 1–4 are not performed. There is used a U tube identical in dimensions to that described in Example 13 but fabricated from a copper tube coated with a glass-like enamel to give corrosion resistance. This glass-coated U tube is further coated by the technique of Example 9, including the ultimate preparation of the reduced cobalt on the surface. The U tube with very adherent coating produced by the spheroidal silica mixture together with the elemental cobalt on the surface is immersed in a liquid reaction mixture comprising 1,4-dicyanobutene in a closed vessel. Hydrogen is admitted in the bottom of the converter and excess was withdrawn from the top of the converter. There is fed with the hydrogen a volume of anhydrous ammonia equal to 10% of the volume of the hydrogen. The temperature of the reaction is controlled to 140° C. and the pressure is controlled to 1500 p.s.i. Under these conditions the double bond of the dicyanobutene is hydrogenated selectively and no hydrogenation of the nitrile groups was encountered. There are no polymerization or other degradation products formed. Thereafter the temperature is raised to 210° C. and the hydrogen and ammonia feed was continued at the original pressure of 1500 p.s.i. Under these conditions the nitrile radicals are both reduced to amine producing hexamethylenediamine. Dowtherm is circulated through the U tube in both cases to control the temperature of the catalyst on the surface to the 140° level and at the 210° C. level in both cases. Without the liquid circulating through the tube the reaction becomes less selective because there is no temperature control on the surface of the U tube and the exothermal effect of the reaction raises the temperature above that obtained when Dowtherm was circulated through the tube. Unwanted by-products are produced.

Instead of the cobalt specified above, there can be used nickel, platinum, palladium or rhodium or one-half platinum, one-half rhodium, one-half palladium, one-half platinum with the total content of the precious metals being only 1% instead of the 7% nickel or cobalt catalyst. When the precious metals catalysts are used, the temperature of hydrogenation of adiponitrile to hexamethylenediamine can be reduced to as low as 155° C. and the hydrogenation of the double bond can be reduced to as low as 110° C. with desirable effects on the reaction efficiency.

EXAMPLE 16

Item 1

A methanol solution of trimethylphosphine platinum chloride is prepared by bubbling trimethylphosphine through methanol containing 10 percent by weight of chloroplatinic acid.

Item 2

A 5 percent by weight solution of 60 m$\mu$ diameter spheroidal silica in methanol is added to a portion of the solution of Item 1 to give a composition of 1 part silica per 2 parts platinum. Methanol is evaporated to produce approximately the platinum concentration of the solution of Item 1.

Item 3

A one inch cube of 1/8" cell alumina honeycomb is dipped into the composition of Item 2, air dried, and heated slowly in a laboratory burner flame. A metallic coating is produced on the surface of the ceramic.

Item 4

A 1/2 inch square of 80 mesh platinum gauze is dipped into the solution of Item 2, air dried, and heated slowly in a laboratory burner flame. Microscopic observation indicates that a rough, metallic coating is present on the surface of the platinum gauze.

Item 5

The products of Items 3 and 4 are heated to a dull red temperature and then positioned over the gases of an unlighted laboratory burner. The products show catalytic activity by continuing to glow at red heat.

EXAMPLE 17

An alumina honeycomb is prepared as set forth in Example 1. The honeycomb has 1/8 inch cells and is 1 inch thick.

A commercially available molecular sieve having a pore size of 13 A. (Linde 13Y) and comprising a crystalline alumino silicate-zeolite is mixed with aqueous colloidal silica. The molecular sieve has the following chemical formula:

$$Na_{86}[(AlO_2)_{86}(SiO_2)_{10}] \cdot 276H_2O$$

The coating composition is prepared by mixing 38 parts of the molecular sieve, 60 parts of a colloidal silica aquasol (16% $SiO_2$) and 43 parts of water.

The honeycomb is dipped into the composition, dried, and calcined at 500° C. for 1 hour. This procedure is repeated until the solids deposited from the composition equal 8.5% of the original weight of the honeycomb. The coating has good adhesion on the honeycomb.

The resulting catalyst is useful for air purification, and if the molecular sieve has previously been ion exchanged to the $NH_4$ form and is thereafter ion exchanged to replace 20% of the $NH_4$ with lanthanum ions, the resultant material is useful for hydrocracking and reforming.

EXAMPLE 18

An alumina honeycomb is prepared as set forth in Example 1.

The honeycomb is dipped into a composition of the following ingredients:

18 parts of activated carbon having a specific surface area of 599 m.$^2$/g. ("Darco" G–60, sold by Atlas Chemical).

18 parts of Linde 4A molecular sieve; this molecular sieve has a pore size of about 4 A. and the following formula:

$$Na_{12}[(AlO_2)_{12}(SiO_2)_{12}] \cdot 27H_2O$$

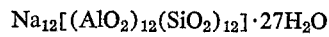

30 parts of an aqueous silica sol (30% SiO$_2$)
45 parts of water.

The honeycomb is then calcined at 300° C. for 1 hour and these steps repeated until the solids deposited from the composition equal 18.6% of the original weight of the honeycomb. The resulting material is useful for air purification.

EXAMPLE 19

One hundred parts of −100 mesh catalyst prepared according to Example 12 of Ser. No. 657,700, filed Aug. 1, 1967 is slurried with 100 parts of water and adjusted to pH 4.8 with nitric acid. Two hundred parts of positive sol containing 20% silica and 2.2% alumina is mixed with the catalyst slurry.

Pieces of mullite honeycomb in the form of 1′ x 1″ x 1″ rhombohedral blocks having ⅛″ hexagonal cell openings are coated by dipping, dried, and calcined at 250° C. for 1 hour. About 23% solids are picked up by the ceramic honeycomb. This product is active in the complete oxidation of hydrocarbons, alcohols, esters, aldehydes, amines, nitro alkanes and similar offensive materials frequently present in exhaust gases.

Instead of the −100 mesh catalyst component being mixed into the colloidal silica-alumina sol as described above, the sol can be painted, sprayed or applied by immersion into the mullite honeycomb and the excess allowed to drain off. While the mullite honeycomb is still moist, the −100 mesh catalyst powder is dusted onto the moist surface to which it then adheres in a thin coating. Thereafter the structures are dried and finally calcined at 250° C.

EXAMPLE 20

To a mullite honeycomb made by the procedures of items 1 through 4 of Example 1 is applied an activated carbon coating composition.

The coating composition is made of the following components:

15 parts of activated carbon
60 parts of a 30% silica sol
26.3 parts of a 66% sugar solution (sucrose)

This corresponds to a composition of 30% activated carbon, 35% SiO$_2$ and 35% sugar solids.

A piece of the alumina honeycomb is immersed in the composition, drained and calcined at 300° C. This operation is repeated until the activated carbon coating applied is equal to 8.82% of the original weight of the honeycomb.

The coating has good adhesion to the alumina honeycomb.

EXAMPLE 21

A platinum solution is prepared by adding concentrated nitric acid to chloroplatinic acid and evaporating to dryness on a hot plate. This step is repeated three times and the product is dissolved in water to yield a 10% platinum solution. The pH of this solution is adjusted to pH 3.2 with nitric acid.

The platinum solution is added to a coating solution, prepared as in Example 20 to give 2.5% platinum based on the total solids in the composition.

Samples of ceramic pellets and rods are treated by dipcoating them in the composition, drying and calcining at 400° C. The coated samples turn uniformly gray after several minutes in a gas-rich flame and show good catalytic activity in continuing to catalyze oxidation of the gas mixture when the flame is blown out.

Samples of ceramic honeycomb are coated in a similar manner and reduced in the gas-rich flame. These averaged 10% coating pick-up based on honeycomb weight and show an excellent activity in hydrocarbon oxidation with both air and nitrogen oxides.

EXAMPLE 22

Samples of platinum and palladium on a low surface area (approx. 80 m.$^2$/g.) carbon carrier were prepared as in Examples III and II, respectively, of U.S. Pat. 2,823,235 (Graham and Spiegler). The final wet paste for each catalyst was suspended in water, adjusted to pH 4.8 to 5.0 with nitric acid, and filtered. The wet cake was blended into a positively charged colloidal silica sol to give a coating formulation containing 46 weight per cent solids. The total solids contained 68 percent carbon catalyst and 29.1 percent silica spherulites and 2.9 percent hydrous alumina. This was coated onto the ceramic honeycomb of Example I, air dried, and calcined at 250° C. for 1 hour. The two coatings were 15.8 and 16.0 percent respectively, of the weight of the support.

The catalyst coated ceramic honeycomb was found to be effective in the hydrogenation of 2,4-dinitrotoluene in 2,4-diaminotoluene solution.

EXAMPLE 23

An activated carbon (North American Carbon Co. Type G355) was crushed to a minus-60 mesh powder. The surface area was found to be 1870 m.$^2$/g. This was blended into positive silica sol to give a coating formulation containing 40.6 percent solids, of which 61.2 percent was carbon. This was coated onto ceramic honeycomb, air dried, and calcined at 280° C. for 1 hour. The coating formed was 21.8 percent of the weight of the support.

A solution was prepared to contain 2.6% platinum, as the tetraamine dinitrite, 4.8% hydrazine hydrate, and 5% ammonium hydroxide. The carbon coated sample was dipped into this solution for 1 minute. After excess liquid was shaken off, a 43.4 percent pick-up of solution was found. The wet sample was placed in a dry steam oven at 95° C. for 30 minutes.

The steamed sample showed no soluble platinum when rinsed with water. The dried catalyst was effective in the hydrogenation of croton aldehyde and showed no loss in activity after steaming at 280° C. for 5 hours.

The invention claimed is:

1. A supported catalyst composed of a low surface area substrate coated with colloidal amorphous silica spherulites from a silica aquasol and between 5 and 150 millimicrons in average diameter and a catalytic material selected from the group consisting of:
   (1) mangano-chromia-manganite,
   (2) oxides, cerates, chromates, chromites, manganates, manganites, molybdates, tungstates, carbonates, stannates, ferrites, and vanadates of iron, cobalt, nickel, zinc, palladium, platinum, ruthenium, rhodium, manganese, chromium, copper, cadmium, silver, calcium, barium, mercury, tin, lead, molybdenum, tungsten, and the rare earths,
   (3) precursors of the oxides,
   (4) elemental ruthenium, rhodium, palladium, and platinum,
   (5) molecular sieves having a pore size of 4–13 A.,
   (6) activated carbon, and
   (7) mixtures thereof.

2. A supported catalyst as defined in claim 1 wherein the low surface area substrate is a thin-walled ordered refractory ceramic structure.

3. A method for forming an adherent catalytic coating on a low surface area substrate comprising applying to said substrate an aqueous composition of colloidal amorphous silica spherulites, drying, and subsequently applying to the coating of colloidal amorphous silica spherulites a catalyst selected from the group consisting of:
   (1) mangano-chromia-manganite,
   (2) oxides, cerates, chromates, chromites, manganates, manganites, molybdates, tungstates, carbonates, stannates, ferrites, and vanadates of iron, cobalt, nickel, zinc, palladium, platinum, ruthenium, rhodium, manganese, chromium, copper, cadmium, silver, calcium, barium, mercury, tin, lead, molybdenum, tungsten, and the rare earths,
   (3) precursors of the oxides, (4) elemental ruthenium, rhodium, palladium, and platinum,
(5) molecular sieves having a pore size of 4–13A.,
(6) activated carbon, and
(7) mixtures thereof.

4. A method for forming an adherent, catalytic coating on a low surface area substrate comprising applying to said substrate an aqueous composition of colloidal amorphous silica spherulites and a catalytic material selected from the group consisting of:
(1) mangano-chromia-manganite,
(2) oxides, cerates, chromates, chromites, manganates, manganites, molybdates, tungstates, carbonates, stannates, ferrites, and vanadates of iron, cobalt, nickel, zinc, palladium, platinum, ruthenium, rhodium, manganese, chromium, copper, cadmium, silver, calcium, barium, mercury, tin, lead, molybdenum, tungsten, and the rare earths,
(3) precursors of the oxides,
(4) elemental ruthenium, rhodium, palladium, and platinum,
(5) molecular sieves having a pore size of 4–13 A.,
(6) activated carbon, and
(7) mixtures thereof.

5. The method of claim 4 wherein the catalytic material is activated carbon and sugar is added to the composition.

6. The process of claim 5 with the additional step of impregnating the activated carbon coating with a catalytic material.

References Cited
UNITED STATES PATENTS

| | | | |
|---|---|---|---|
| 1,867,435 | 7/1932 | Adair | 252—446 |
| 2,580,806 | 1/1952 | Malina | 252—463 |
| 2,921,035 | 1/1960 | Houdry | 252—463 |
| 3,125,539 | 3/1964 | Teague | 252—455 |
| 3,155,627 | 11/1964 | Cole et al. | 252—454 |
| 3,252,917 | 5/1966 | Mindick et al. | 252—455 X |
| 3,284,369 | 11/1966 | Bergna et al. | 252—454 |
| 3,294,576 | 12/1966 | Piccione et al. | 252—447 X |
| 3,329,627 | 7/1967 | Gladrow et al. | 252—455 X |

DANIEL E. WYMAN, Primary Examiner

C. F. DEES, Assistant Examiner

U.S. Cl. X.R.

252—447, 454, 455, 456, 457, 458, 459, 460